US012676393B2

(12) United States Patent
Zheng

(10) Patent No.: US 12,676,393 B2
(45) Date of Patent: Jul. 7, 2026

(54) ALKALINE ELECTRODES WITH ELECTROLYTE RESERVOIRS

(71) Applicant: Energizer Brands, LLC, St. Louis, MO (US)

(72) Inventor: Guanghong Zheng, Westlake, OH (US)

(73) Assignee: Energizer Brands, LLC, St. Louis, MO (US)

( * ) Notice: Subject to any disclaimer, the term of this patent is extended or adjusted under 35 U.S.C. 154(b) by 477 days.

(21) Appl. No.: 18/055,217

(22) Filed: Nov. 14, 2022

(65) Prior Publication Data

US 2024/0162590 A1     May 16, 2024

(51) Int. Cl.
| *H01M 50/682* | (2021.01) |
| *H01M 4/24* | (2006.01) |
| *H01M 6/04* | (2006.01) |

(52) U.S. Cl.
CPC ........... *H01M 50/682* (2021.01); *H01M 4/24* (2013.01); *H01M 6/045* (2013.01)

(58) Field of Classification Search
CPC ........ H01M 50/682; H01M 4/24; H01M 6/04; H01M 6/045
USPC ....................................................... 429/164
See application file for complete search history.

(56) References Cited

U.S. PATENT DOCUMENTS

| 316,409 | A | 4/1885 | Shaw |
| 678,512 | A | 7/1901 | Perry |
| 1,626,173 | A | 4/1927 | Yngve |
| 1,641,524 | A | 9/1927 | Birdsall |
| 2,480,839 | A | 9/1949 | Daniel |
| 2,542,094 | A | 2/1951 | Percy et al. |

(Continued)

FOREIGN PATENT DOCUMENTS

| DE | 0431881 C | 7/1926 |
| EP | 1093671 A1 | 4/2001 |

(Continued)

OTHER PUBLICATIONS

International Search Report and Written Opinion for International Application No. PCT/US2020/039662, dated Oct. 12, 2020, (11 pages), European Patent Office, Rijswijk, Netherlands.

(Continued)

*Primary Examiner* — Jonathan G Leong
*Assistant Examiner* — John S Medley
(74) *Attorney, Agent, or Firm* — Alston & Bird LLP

(57) ABSTRACT

Systems, apparatuses, and/or the like are provided. In some embodiments, an electrochemical cell includes a container; a first electrode disposed within the container. In some embodiments, the first electrode includes a first electrode portion; and a second electrode portion conductively connected with the first electrode portion and spaced apart from the first electrode portion to define at least one reservoir between the first electrode portion and the second electrode portion. The at least one reservoir is bounded at least in part by a first reservoir wall of the first electrode portion and a second reservoir wall of the second electrode portion. A second electrode may be disposed within the container, and a separator is disposed between the first electrode and the second electrode. In some embodiments, the cell includes an electrolyte solution permeating the first electrode and the second electrode and at least partially filling the at least one reservoir.

20 Claims, 11 Drawing Sheets

(56)        References Cited

U.S. PATENT DOCUMENTS

| | | | |
|---|---|---|---|
| 2,542,574 A | 2/1951 | Ruben | |
| 2,542,576 A | 2/1951 | Ruben | |
| 2,960,558 A | 11/1960 | Marsal et al. | |
| 2,977,401 A | 3/1961 | Marsal et al. | |
| 2,980,747 A | 4/1961 | Daley | |
| 3,156,585 A | 11/1964 | Masaru et al. | |
| 3,196,051 A | 7/1965 | Rodolfo | |
| 3,335,031 A | 8/1967 | Kordesch | |
| 3,350,235 A | 10/1967 | Rodolfo | |
| 3,364,073 A | 1/1968 | Rodolfo | |
| 3,490,951 A | 1/1970 | George | |
| 3,496,018 A | 2/1970 | Hamlen et al. | |
| 3,738,869 A | 6/1973 | Zaleski | |
| 3,787,243 A | 1/1974 | Zaleski | |
| 3,945,847 A | 3/1976 | Kordesch et al. | |
| 4,011,103 A | 3/1977 | Kordesch | |
| 4,016,339 A | 4/1977 | Gray et al. | |
| 4,032,695 A | 6/1977 | Coibion | |
| 4,042,756 A | 8/1977 | Goebel et al. | |
| 5,300,371 A | 4/1994 | Tomantschger et al. | |
| 5,472,806 A | 12/1995 | Meintjes | |
| 5,489,493 A | 2/1996 | Urry | |
| 5,518,836 A | 5/1996 | Mccullough | |
| 5,639,578 A | 6/1997 | Urry | |
| 5,716,729 A | 2/1998 | Sunderland et al. | |
| 5,856,040 A * | 1/1999 | Newman | H01M 4/80 |
| | | | 429/165 |
| 5,869,205 A | 2/1999 | Mick et al. | |
| 5,948,561 A | 9/1999 | Urry | |
| 6,074,781 A | 6/2000 | Jurca | |
| 6,081,992 A | 7/2000 | Kelemen et al. | |
| 6,150,052 A | 11/2000 | Urry | |
| 6,200,700 B1 * | 3/2001 | Yano | H01M 6/085 |
| | | | 429/165 |
| 6,207,322 B1 | 3/2001 | Kelsey et al. | |
| 6,224,640 B1 | 5/2001 | Tucholski | |
| 6,261,717 B1 | 7/2001 | Luo et al. | |
| 6,326,102 B1 | 12/2001 | Getz | |
| 6,342,317 B1 | 1/2002 | Patel et al. | |
| 6,410,187 B1 | 6/2002 | Luo et al. | |
| 6,472,099 B1 | 10/2002 | Lee et al. | |
| 6,482,543 B1 | 11/2002 | Shelekhin et al. | |
| 6,592,635 B2 | 7/2003 | Getz | |
| 6,737,189 B1 | 5/2004 | Vandayburg et al. | |
| 6,805,995 B2 | 10/2004 | Yoshinaka et al. | |
| 6,869,727 B2 | 3/2005 | Slezak | |
| 7,264,903 B2 | 9/2007 | Coffey et al. | |
| 7,341,803 B2 | 3/2008 | Huang et al. | |
| 7,553,585 B2 | 6/2009 | Slezak | |
| 9,306,206 B2 | 4/2016 | Davis et al. | |

| | | | |
|---|---|---|---|
| 11,552,304 B2 | 1/2023 | Huang et al. | |
| 11,552,305 B2 | 1/2023 | Huang et al. | |
| 11,560,321 B2 | 1/2023 | Zheng | |
| 2001/0028976 A1 | 10/2001 | Treger et al. | |
| 2001/0053473 A1 | 12/2001 | Getz | |
| 2002/0106558 A1 | 8/2002 | Maske et al. | |
| 2002/0160262 A1 * | 10/2002 | Urry | H01M 4/04 |
| | | | 429/165 |
| 2003/0162086 A1 | 8/2003 | Longhi et al. | |
| 2004/0058235 A1 | 3/2004 | Huang et al. | |
| 2004/0258982 A1 | 12/2004 | Coffey et al. | |
| 2009/0253040 A1 | 10/2009 | Okada | |
| 2013/0189592 A1 | 7/2013 | Roumi et al. | |
| 2013/0236756 A1 | 9/2013 | Wang et al. | |
| 2016/0006043 A1 * | 1/2016 | Hucker | H01G 11/18 |
| | | | 429/118 |
| 2020/0381690 A1 * | 12/2020 | Huang | H01M 50/457 |
| 2020/0411878 A1 | 12/2020 | Huang et al. | |
| 2020/0411884 A1 | 12/2020 | Huang et al. | |
| 2021/0175532 A1 * | 6/2021 | Lee | H01M 8/188 |
| 2023/0107553 A1 | 4/2023 | Huang et al. | |
| 2023/0108519 A1 | 4/2023 | Huang et al. | |

FOREIGN PATENT DOCUMENTS

| | | |
|---|---|---|
| FR | 2622359 | 4/1989 |
| GB | 1036156 A | 7/1966 |
| GB | 2231196 A | 11/1990 |
| JP | 45-022653 B | 7/1970 |
| JP | 49-011504 | 3/1974 |
| JP | 52-142237 A | 11/1977 |
| WO | 00/02278 A1 | 1/2000 |
| WO | 00/33397 A2 | 6/2000 |
| WO | 2000/003397 A1 | 6/2000 |
| WO | 2001/008244 A1 | 2/2001 |
| WO | 01/97298 A2 | 12/2001 |
| WO | 01/97302 A2 | 12/2001 |
| WO | 01/99214 A1 | 12/2001 |
| WO | 2013/133952 A1 | 9/2013 |

OTHER PUBLICATIONS

IPEA/409—International Preliminary Report on Patentability Mailed on Sep. 27, 2021 for WO Application No. PCT/US20/039662, 6 page(s).

NonFinal Office Action for U.S. Appl. No. 16/454,991, dated Jan. 26, 2021, (29 pages), United States Patent and Trademark Office, US.

Second Written Opinion for International Application No. PCT/US2020/039662, dated Jun. 1, 2021, (6 pages), European Patent Office, Munich, Germany.

* cited by examiner

700

704

708

710

704A
704B

702

710

706A
706B

ALKALINE ELECTRODES WITH ELECTROLYTE RESERVOIRS

TECHNICAL FIELD

The present disclosure relates generally to alkaline batteries, and more particularly to alkaline electrodes with electrolyte reservoirs.

BACKGROUND

Alkaline electrochemical cells are commercially available in cell sizes commonly known as LR6 (AA), LR03 (AAA), LR14 (C) and LR20 (D). The cells have a cylindrical shape that must comply with the dimensional standards that are set by organizations such as the International Electrotechnical Commission. The electrochemical cells are utilized by consumers to power a wide range of electrical devices, for example, clocks, radios, toys, electronic games, film cameras generally including a flashbulb unit, as well as digital cameras. Such electrical devices possess a wide range of electrical discharge conditions, from low drain ("low rate") to relatively high drain ("high rate"). Due to the increased use of high drain devices, a need exists for a battery having improved high rate discharge properties. However, improvements to high rate discharge properties may negatively affect low rate discharge properties, and vice-versa.

Batteries with high anode/cathode interfacial area may have a better high-rate performance. However, batteries with a high interfacial area between the anode and cathode require a corresponding high surface area of separator material to maintain electrical separation between the anode and cathode. The increase in separator material decreases the volume inside the battery that is available for active material.

Hence, a need exists for alternative cell constructions having improved high-rate discharge performance which minimize the inclusion of non-active materials (e.g., separator materials) within the cell. Through applied effort, ingenuity, and innovation, Applicant has solved problems relating to batteries with high drain discharge properties by developing solutions embodied in the present disclosure, which are described in detail below.

BRIEF SUMMARY

According to various embodiments, an electrochemical cell is provided. In some embodiments, the electrochemical cell may include a container. In some embodiments, the electrochemical cell may include a first electrode disposed within the container, wherein the first electrode includes a first electrode portion and a second electrode portion conductively connected with the first electrode portion and spaced apart from the first electrode portion to define at least one reservoir between the first electrode portion and the second electrode portion. In some embodiments, the at least one reservoir is bounded at least in part by a first reservoir wall of the first electrode portion and a second reservoir wall of the second electrode portion. In some embodiments, the second electrode is disposed within the container. In some embodiments, a separator is disposed between the first electrode and the second electrode. In some embodiments, the electrochemical cell includes an electrolyte solution permeating the first electrode and the second electrode and at least partially filling the at least one reservoir.

In some embodiments, the first electrode includes a cathode and the second electrode includes an anode, and the first electrode portion includes a first cathode portion, and the second electrode portion includes a second cathode portion.

In some embodiments, the electrochemical cell includes a conductor extending between the first and the second electrode portions, wherein the first electrode portion and the second electrode portion are concentric.

In some embodiments, the electrochemical cell includes a third electrode portion that conductively connects the first electrode portion and the second electrode portion.

In some embodiments, the first electrode portion includes a first set of one or more slotted rings and the second electrode portion includes a second set of one or more slotted rings, and wherein each ring of the first set of one or more slotted rings is conductively connected to a corresponding ring of the second set of one or more slotted rings.

In some embodiments, the third electrode portion includes one or more conductive disks.

In some embodiments, the third electrode portion includes at least one mesh.

In some embodiments, one or more voids are disposed within the one or more slotted rings.

In some embodiments, the one or more conductive disks are selected from a group consisting of nickel and steel.

In some embodiments, the at least one mesh is selected from a group consisting of nickel and steel.

In some embodiments, the first electrode includes an anode and the second electrode includes a cathode, and wherein the first electrode portion includes a first anode portion, and the second electrode portion includes a second anode portion.

In some embodiments, the first reservoir wall and the second reservoir wall are covered by a separator material, wherein the separator material includes one or more holes.

In some embodiments, the at least one reservoir includes a porous foam.

In some embodiments, the porous foam is selected from a group consisting of inert material and zinc.

According to various embodiments, an electrochemical cell is provided. In some embodiments, the electrochemical cell includes a container. In some embodiments, the electrochemical cell includes a first electrode disposed within the container. In some embodiments, the first electrode includes a first electrode portion and at least one open space defining at least one reservoir within the first electrode. In some embodiments, the at least one reservoir is bounded at least in part by a first reservoir wall of the first electrode portion and a second reservoir wall of the second electrode portion. In some embodiments, the electrochemical cell includes a second electrode disposed within the container. In some embodiments, the electrochemical cell includes a separator disposed between the first electrode and the second electrode. In some embodiments, the electrochemical cell includes an electrolyte solution permeating the first electrode and the second electrode and at least partially filling the at least one reservoir.

In some embodiments, the electrochemical cell includes a current collector, wherein the current collector is not aligned with the center of the electrochemical cell.

In some embodiments, the first electrode is an anode and the second electrode is a cathode.

In some embodiments, the at least one reservoir is selected from a group consisting of at least one foam and at least one mesh.

In some embodiments, the at least one mesh includes zinc.

The above summary is provided merely for purposes of summarizing some example aspects to provide a basic understanding of some aspects of the disclosure. Accordingly, it will be appreciated that the above-described aspects are merely examples. It will be appreciated that the scope of the disclosure encompasses many potential aspects in addition to those here summarized, some of which will be further described below.

DETAILED DESCRIPTION AND DISCUSSION

Figure 1:
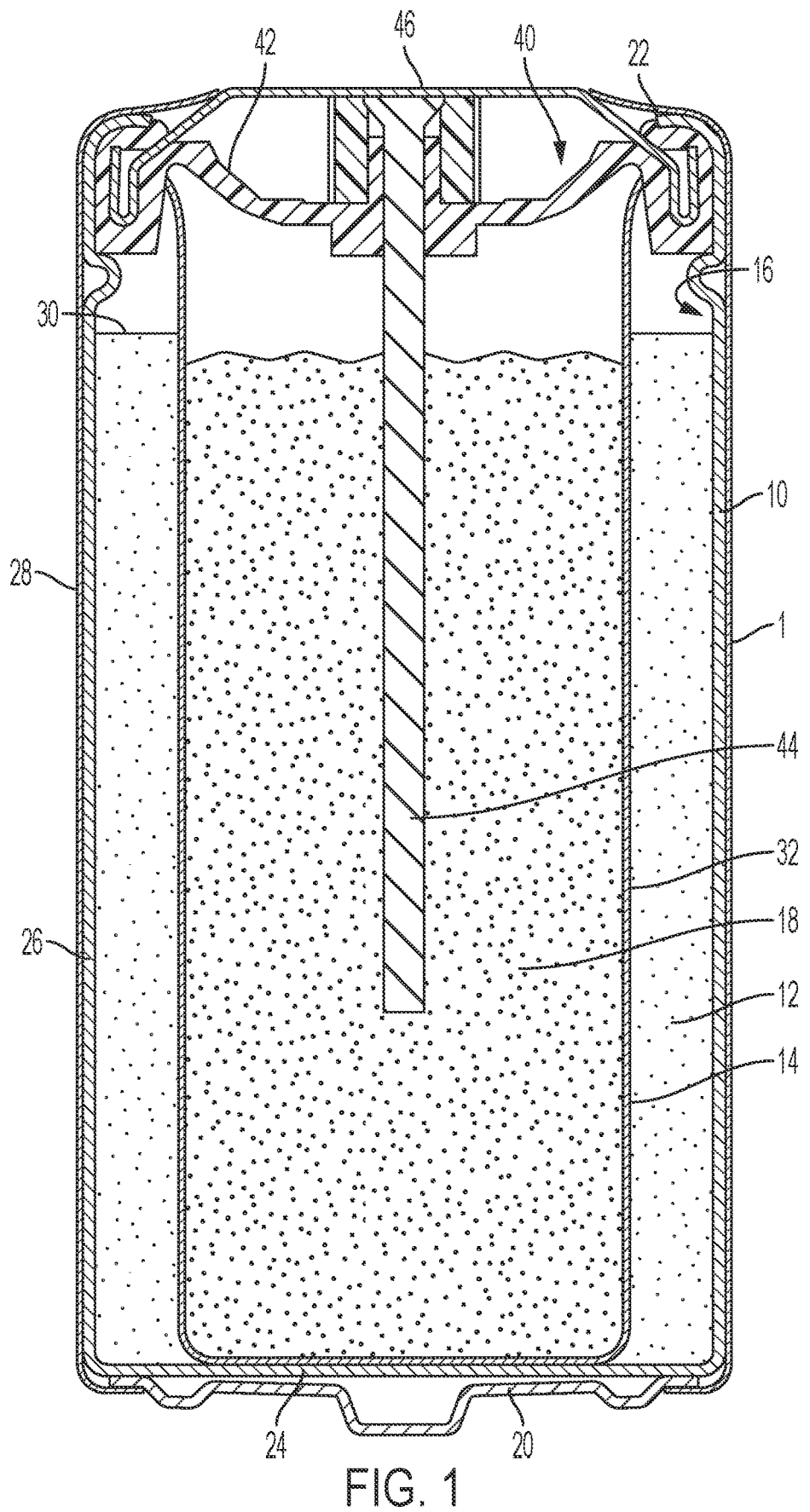
FIG. 1 is a side, cross-sectional, elevational view of an example alkaline electrochemical cell in accordance with some embodiments.

Various embodiments now will be described more fully hereinafter with reference to the accompanying drawings, in which some, but not all embodiments are shown. Indeed, various embodiments may be embodied in many different forms and should not be construed as limited to the embodiments set forth herein; rather, these embodiments are provided so that this disclosure will satisfy applicable legal requirements. Like numbers refer to like elements throughout. In the following description, various components may be identified as having specific values or parameters, however, these items are provided as exemplary embodiments. Indeed, the exemplary embodiments do not limit the various aspects and concepts of the embodiments as many comparable parameters, sizes, ranges, and/or values may be implemented. The terms "first," "second," and the like, "primary," "exemplary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item. For example, "an organic additive" may refer to two or more organic additives.

Each embodiment disclosed herein is contemplated as being applicable to each of the other disclosed embodiments. All combinations and sub-combinations of the various elements described herein are within the scope of the embodiments.

It is understood that where a parameter range is provided, all integers and ranges within that range, and tenths, hundredths, thousandths, ten-thousandths, and hundred-thousandths thereof, are also provided by the embodiments. For example, "5-10%" includes 5%, 6%, 7%, 8%, 9%, and 10%; 5.0%, 5.1%, 5.2% . . . 9.8%, 9.9%, and 10.0%; and 5.00%, 5.01%, 5.02% . . . 9.98%, 9.99%, and 10.00%, as well as, for example, 6-9%, 7-10%, 5.1%-9.9%, and 5.01%-9.99%. As another example, "0.00001-1 M" includes 0.00005-0.0001 M and 0.001-0.01 M.

As used herein, "about" in the context of a numerical value or range means within ±10% of the numerical value or range recited or claimed.

As used herein, "improvement" with respect to specific capacity means that the specific capacity is increased. Generally, an "improvement" of a property or metric of performance of a material or electrochemical cell means that the property or metric of performance differs (compared to that of a different material or electrochemical cell) in a manner that a user or manufacturer of the material or cell would find desirable (e.g., costs less, lasts longer, provides more power, more durable, easier or faster to manufacture, etc.).

As used herein, "specific capacity" refers to the total amount of charge in an electrochemical cell when discharged at a particular rate. This is typically measured in ampere hours.

As used herein, "run-time" refers to the length of time that an electrochemical cell will be able to provide a certain level of charge.

The embodiments will be better understood by reference to the figures, which show various embodiments of a cylindrical electrochemical cell in elevational cross-section, with the cell having a nail-type or bobbin-type construction and dimensions comparable to a conventional LR6 (AA) size alkaline cell. As illustrated, the bobbin-type construction is characterized by a second electrode 12 (e.g., cathode) forming a hollow cylinder (having a circular cross-section) adjacent the cylindrical walls of can. The cylindrical interior wall of the second electrode 12 is lined with a separator 32, and the interior of the separator is filled with a first electrode 18 (e.g., anode), such that the first electrode has a cylindrical shape (with a circular cross-section) corresponding to the interior shape of the second electrode 18 that is lined with the separator 32. Thus, for a bobbin-type cell, the interfacial surface between the cathode and the anode (which is lined with the separator) typically has a circular cross section. Changing the cross-sectional shape of the interfacial surface increases the interfacial area of the bobbin-type cell.

It will be understood that the embodiments described herein apply to both Alkaline ($Zn/MnO_2$) and Alkaline-P ($Zn/MnO_2$+other) chemistries. The materials and designs for the components of the electrochemical cell illustrated in FIG. 1 are for the purposes of illustration, and other materials and designs may be substituted. The described, non-limiting embodiment is directed to an alkaline electrochemical cell comprising manganese dioxide in the cathode as an active material.

In FIG. 1, an electrochemical cell 1 is shown, including a container or can 10 having a closed bottom end 24, a top end 22 and sidewall 26 there between. The closed bottom end 24 includes a terminal cover 20 including a protrusion. The can 10 has an inner wall 16. In the embodiment, a positive terminal cover 20 is welded or otherwise attached to the bottom end 24. In one embodiment, the terminal cover 20 can be formed with plated steel for example with a protruding nub at its center region. Container 10 can be formed of a metal, such as steel, preferably plated on its interior with nickel, cobalt and/or other metals or alloys, or other materials, possessing sufficient structural properties that are compatible with the various inputs in an electrochemical cell. A label 28 can be formed about the exterior surface of container 10 and can be formed over the peripheral edges of the positive terminal cover 20 and negative terminal cover 46, so long as the negative terminal cover 46 is electrically insulated from container 10 and positive terminal 20.

Disposed within the container 10 are a first electrode 18 and second electrode 12 with a separator 14 therebetween. First electrode 18 is disposed within the space defined by separator 14 and closure assembly 40 secured to open end 22 of container 10. Closed end 24, sidewall 26, and closure assembly 40 define a cavity in which the electrodes of the cell are housed. In some embodiments, the first electrode 18 and/or second electrode 12 comprises a plurality of electrode portions, such as a first, second, and/or third portions. In some embodiments, the electrode portions are conductively connected, such as the first electrode portion and the second electrode portion being conductively connected by the third electrode portion.

Closure assembly 40 comprises a closure member 42 such as a gasket, a current collector 44 and conductive terminal 46 in electrical contact with current collector 44. Closure member 42 preferably contains a pressure relief vent that will allow the closure member to rupture if the cell's internal pressure becomes excessive. Closure member 42 can be formed from a polymeric or elastomer material, for example Nylon-6,6, an injection-moldable polymeric blend, such as polypropylene matrix combined with poly(phenylene oxide) or polystyrene, or another material, such as a metal, provided that the current collector 44 and conductive terminal 46 are electrically insulated from container 10 which serves as the current collector for the second electrode 12. In the embodiment illustrated, current collector 44 is an elongated nail or bobbin-shaped component extending into the first electrode 18. Current collector 44 is made of one or more metals or metal alloys, such as copper or brass. In certain embodiments, parts of the current collector 44 may be a conductively plated nail/rod having a metallic or plastic core that is plated with the one or more metals or metal alloys. Other suitable materials can be utilized. Current collector 44 is inserted through a hole (e.g., a centrally located hole) in closure member 42. In some embodiments, and as shown in at least FIG. 11, the current collector 44 may be disposed at an off-center location within the first electrode 18.

First electrode 18 is preferably a negative electrode or anode. In some embodiments, the negative electrode includes a mixture of one or more active materials, an electrically conductive material, optionally solid zinc oxide, and a surfactant. The negative electrode can optionally include other additives, for example a binder or a gelling agent, and the like.

Zinc is an example main active material for the negative electrode of the embodiments. Mercury, aluminum, silicon, lithium, and magnesium, or mixtures thereof may also be used, in alternate embodiments. Preferably, the volume of active material utilized in the negative electrode is sufficient to maintain a desired particle-to-particle contact and a desired anode to cathode (A:C) ratio.

Particle-to-particle contact should be maintained during the useful life of the battery. If the volume of active material in the negative electrode is too low, the cell's voltage may suddenly drop to an unacceptably low value when the cell is powering a device. The voltage drop is believed to be caused by a loss of continuity in the conductive matrix of the negative electrode. The conductive matrix can be formed from undischarged active material particles, conductive electrochemically formed oxides, or a combination thereof. A voltage drop can occur after oxide has started to form, but before a sufficient network is built to bridge between all active material particles present.

Zinc suitable for use in the embodiments may be purchased from a number of different commercial sources under various designations, such as BIA 100, BIA 115. Umicore S. A., Brussels, Belgium is an example of a zinc supplier. In some embodiments, the zinc powder generally has 25 to 40 percent fines less than 75 μm, and preferably 28 to 38 percent fines less than 75 μm. Generally lower percentages of fines will not allow desired DSC service to be realized and utilizing a higher percentage of fines can lead to increased gassing. A correct zinc alloy is needed in order to reduce negative electrode gassing in cells and to maintain test service results.

A surfactant that is either a nonionic or anionic surfactant, or a combination thereof is usually present in the negative electrode. It has been found that anode resistance is increased during discharge by the addition of solid zinc oxide alone, but is mitigated by the addition of the surfactant. The addition of the surfactant increases the surface charge density of the solid zinc oxide and lowers anode resistance as indicated above.

One example surfactant is DISPERBYK-190 from BYK-Chemie GmbH of Wesel, Germany. The surfactant is present in an amount sufficient to disperse the solid zinc oxide, preferably about 0.00064 to about 0.20 weight percent or more, based on the total weight of the negative electrode. DISPERBYK-190 is believed to be a solution including a water soluble, high molecular weight block copolymer including one or more functional groups, believably at least two different types of functional groups. The surfactant has an anionic/nonionic character due to the respective functional groups thereof. It is further believed that the number average molecular weight of a block copolymer DISPERBYK-190 is greater than 1000 measured utilizing gel permeation chromatography. Water solubility may be offset by the presence of a hydrophobic component if present in the electrode composition. In one embodiment, the surfactant is utilized in an amount from about 10 to about 100 ppm and preferably from about 15 to about 50 ppm of zinc utilized in the negative electrode. It is believed that DISPERBYK-190 does not contain any organic solvents and is, therefore, suitable for aqueous systems. DISPERBYK-190 has an acid value in mg KOH/g of 10 and a density of 1.06 g/ml at 20° C.

In an embodiment, the aqueous electrolyte is an aqueous alkaline electrolyte, and comprises an alkaline metal hydroxide such as potassium hydroxide (KOH), sodium hydroxide (NaOH), or the like, or mixtures thereof. Potassium hydroxide is preferred. The alkaline electrolyte used to form the gelled electrolyte of the negative electrode contains the alkaline metal hydroxide in an amount from about 26 to about 36 weight percent, for example from about 26 to about 32 weight percent, and specifically from about 26 to about 30 weight percent based on the total weight of the alkaline electrolyte. Interaction takes place between the negative electrode alkaline metal hydroxide and the added solid zinc oxide, and it has been found that lower alkaline metal hydroxide improves DSC service. Electrolytes which are less alkaline are preferred, but can lead to rapid electrolyte separation of the anode. Increase of alkaline metal hydroxide concentration creates a more stable anode, but can reduce DSC service. The metal ions in the electrolyte can have a concentration of 0.1-20,000 ppm. In alternate embodiments, the electrolyte may be neutral or salt-based, as in a zinc-carbon cell.

A gelling agent is preferably utilized in the negative electrode as is well known in the art, such as a crosslinked polyacrylic acid, such as Carbopol® 940, which is available from Noveon, Inc. of Cleveland, Ohio, USA. Carboxymethylcellulose, polyacrylamide and sodium polyacrylate are examples of other gelling agents that are suitable for use in an alkaline electrolyte solution. Gelling agents are desirable in order to maintain a substantially uniform dispersion of zinc and solid zinc oxide particles in the negative electrode. The amount of gelling agent present is chosen so that lower rates of electrolyte separation are obtained and anode viscosity in yield stress are not too great which can lead to problems with anode dispensing.

Other components which may be optionally present within the negative electrode include, but are not limited to, gassing inhibitors, organic or inorganic anticorrosive agents, plating agents, binders or other surfactants. Examples of gassing inhibitors or anticorrosive agents can include indium salts, such as indium hydroxide, perfluoroalkyl ammonium salts, alkali metal sulfides, etc.

The negative electrode can be formed in a number of different ways as known in the art. For example, the negative electrode components can be dry blended and added to the cell, with alkaline electrolyte being added separately or, as in a preferred embodiment, a pre-gelled negative electrode process is utilized.

In one embodiment, the zinc and solid zinc oxide powders, and other optional powders other than the gelling agent, are combined and mixed. Afterwards, the surfactant is introduced into the mixture containing the zinc and solid zinc oxide. A pre-gel comprising alkaline electrolyte, soluble zinc oxide and gelling agent, and optionally other liquid components, are introduced to the surfactant, zinc and solid zinc oxide mixture which are further mixed to obtain a substantially homogenous mixture before addition to the cell. Alternatively, in a further preferred embodiment, the solid zinc oxide is predispersed in a negative electrode pre-gel comprising the alkaline electrolyte, gelling agent, soluble zinc oxide and other desired liquids, and blended, such as for about 15 minutes. The solid zinc oxide and surfactant are then added and the negative electrode is blended for an additional period of time, such as about 20 minutes. The amount of gelled electrolyte utilized in the negative electrode is generally from about 25 to about 35 weight percent, and for example, about 32 weight percent based on the total weight of the negative electrode. Volume percent of the gelled electrolyte may be about 70% based on the total volume of the negative electrode.

In addition to the aqueous alkaline electrolyte absorbed by the gelling agent during the negative electrode manufacturing process, an additional quantity of an aqueous solution of alkaline metal hydroxide, i.e., "free electrolyte" or "alkaline electrolyte solution," is added to the cell during the manufacturing process. The free electrolyte may be incorporated into the cell by disposing it into the cavity defined by the positive electrode or negative electrode, or combinations thereof. The method used to incorporate free electrolyte into the cell is not critical provided it is in contact with the negative electrode, positive electrode, and separator. In one embodiment, free electrolyte is added both prior to addition of the negative electrode mixture as well as after addition. In one embodiment, about 0.97 grams of 29 weight percent KOH solution is added to an LR6 type cell as free electrolyte, with about 0.87 grams added to the separator lined cavity before the negative electrode is inserted. The remaining part of the 29 weight percent KOH solution is injected into the separator lined cavity after the negative electrode has been inserted.

This free electrolyte, in an embodiment, comprises the metal additive and is the source of metal ions which will adsorb to the manganese dioxide-containing cathode. In an embodiment, the same metal additive present in the free electrolyte is present in the electrolyte solution incorporated into the cathode. In an embodiment, the free electrolyte has a different concentration of metal additive than does the cathode electrolyte solution. In an alternate embodiment, the free electrolyte and the cathode electrolyte solution have the same concentration of the metal additive. In an embodiment, the metal additive present in the free electrolyte is not present in the cathode.

In an embodiment, the metal additive will be insoluble or have very low solubility in the electrolyte solution at room temperature ($\sim25°$ C.). In an embodiment, the metal additive will have a solubility of less than $1 \times 10^{-x}$, where x is from 10-75.

Second electrode 12, also referred to herein as the positive electrode or cathode, preferably includes manganese dioxide (typically as EMD) as the electrochemically active material. EMD is present in an amount generally from about 80 to about 92 weight percent and preferably from about 81 to 85 weight percent based on the total weight of the positive electrode, i.e., manganese dioxide, conductive material, positive electrode electrolyte and additives, including organic additive(s), if present. The positive electrode is formed by combining and mixing desired components of the electrode followed by forming the mixture into a desired shape, such as a ring shape (which may define reservoirs within portions of the ring, as discussed herein). Second electrode 12 has a ledge 30 and an interior surface 32 as illustrated in FIG. 1. In certain embodiments, the second electrode may be formed by pre-forming a plurality of disks from the mixture comprising EMD, and optionally additive (s), and then inserting the disks into the container to form the tubular-shaped second electrode. The cell shown in FIG. 1 would typically include 3 or 4 disks. In certain embodiments, the second electrode 12 additionally comprises one or more conductive components that may be molded into the second electrode 12, such as metallic mesh components to maintain electrical conductivity between various portions of the second electrode 12. As will be described in greater detail later in the disclosure, the second electrode 12 may be comprised of a variety of different disks of varying shapes, sizes, and configurations.

The positive electrode can include other components such as a conductive material, for example graphite, that when mixed with the EMD provides an electrically conductive matrix substantially throughout the positive electrode. Conductive material can be natural (mined), or synthetic (manufactured). In one embodiment, the cells include a positive electrode having an active material or oxide to carbon ratio (O:C ratio) that ranges from about 12 to about 24. In an embodiment, the O:C ratio ranges from about 12-14. Too high of an oxide to carbon ratio decreases the container to cathode resistance, which affects the overall cell resistance and can have a potential effect on high rate tests, such as the DSC test, or higher cut-off voltages. Furthermore, the graphite can be expanded or non-expanded. Suppliers of graphite for use in alkaline batteries include Timcal America of Westlake, Ohio; Superior Graphite Company of Chicago, Ill.; and Lonza, Ltd. of Basel, Switzerland. Conductive material is present generally in an amount from about 5 to about 10 weight percent based on the total weight of the positive electrode. Too much graphite can reduce EMD input, and thus cell capacity; too little graphite can increase container to cathode contact resistance and/or bulk cathode resistance. An example of an additional additive is barium sulfate ($BaSO_4$), which is commercially available from Bario E. Derivati S.p.A. of Massa, Italy. The barium sulfate is present in an amount generally from about 1 to about 2 weight percent based on the total weight of the positive electrode. Other additives can include, for example, barium acetate, titanium dioxide, binders such as coathylene, and calcium stearate.

In an embodiment, the cathode comprises the metal additive as a solid. In an embodiment, the metal additive is present as a solid in the cathode at a concentration of 0.1-1000 ppm compared to the total mass of the cathode.

In some embodiments, the cathode may include nickelate materials as described in U.S. patent application Ser. No. 17/032,496, the subject matter of which is incorporated herein by reference in its entirety.

In one embodiment, a positive electrode component (EMD), conductive material, and optionally additive(s) (e.g., barium sulfate and/or other additives) are mixed together to form a homogeneous mixture. During the mixing process, an alkaline electrolyte solution, such as from about 37% to about 40% KOH solution, optionally including organic additive(s), is evenly dispersed into the mixture thereby insuring a uniform distribution of the solution throughout the positive electrode materials. The mixture is then molded into a desired shape for use within a cell. Mix moisture optimization allows positive electrodes to be molded with minimal splash and flash due to wet mixes, and with minimal spalling and excessive tool wear due to dry mixes, with optimization helping to achieve a desired high cathode weight. Moisture content in the positive electrode mixture can affect the overall cell electrolyte balance and has an impact on high rate testing.

One of the parameters utilized by cell designers characterizes cell design as the ratio of one electrode's electrochemical capacity to the opposing electrode's electrochemical capacity, such as the anode (A) to cathode (C) ratio, i.e., A:C ratio. For an LR6 type alkaline primary cell that utilizes zinc in the negative electrode or anode and $MnO_2$ in the positive electrode or cathode, the A:C ratio may be about 1.3:1 to about 1.1:1 for electrochemical cells utilizing ring-molded cathodes. In general, unless stated otherwise, this A:C ratio may be utilized for the various embodiments of electrochemical cells in this disclosure.

Separator 14 is provided in order to separate first electrode 18 from second electrode 12. Separator 14 maintains a physical dielectric separation of the positive electrode's electrochemically active material from the electrochemically active material of the negative electrode and allows for transport of ions between the electrode materials. In addition, the separator acts as a wicking medium for the electrolyte and as a collar that prevents fragmented portions of the negative electrode from contacting the top of the positive electrode. Separator 14 can be a layered ion permeable, non-woven fibrous fabric. A typical separator usually includes two or more layers of paper. Conventional separators are usually formed either by pre-forming the separator material into a cup-shaped basket that is subsequently inserted under the cavity defined by second electrode 12 and closed end 24 and any positive electrode material thereon, or forming a basket during cell assembly by inserting two rectangular sheets of separator into the cavity with the material angularly rotated 90° relative to each other. Conventional pre-formed separators are typically made up of a sheet of non-woven fabric rolled into a cylindrical shape that conforms to the inside walls of the second electrode and has a closed bottom end.

In some embodiments, an electrochemical cell comprises a plurality of cathode portions, and/or a plurality of anode portions. In some embodiments, a single separator electrically isolates all of the cathode portions from all of the anode portions. Moreover, in some embodiments, the plurality of cathode portions-either individually or in combination-defines one or more electrolyte reservoirs. In some embodiments, the plurality of anode portions-either individually or in combination-defines one or more electrolyte reservoirs.

In embodiments where the anode is not centrally located within the cell, or in embodiments in which the electrochemical cell includes multiple anode portions that are not in contact with one another, a current collector may take a different shape other than a linear rod. For example, a current collector may have a bent shape, an off-center position, and/or other modifications to electrically connect the anode with the appropriate terminal of the electrochemical cell. Examples of such configurations are described in U.S. Patent Publ. No. 2020/0411878, the contents of which are incorporated herein by reference in their entirety. It should be understood that the embodiments discussed herein with respect to hybrid current collector configurations may be utilized with current collectors having different positions and/or shapes.

Example Alkaline Electrodes with Cathodes Containing Electrolyte Reservoirs

Batteries with a high anode/cathode interfacial area may have an improved high-rate performance (e.g., with a longer runtime at high discharge rates) as compared with comparably sized batteries having similar active material content but with a lower anode/cathode interfacial area. It is believed that the improved high-rate performance of cells having high interfacial area between the anode and cathode is because an increased interfacial area of each of the electrodes creates more reacting sites resulted from the electrolyte transferring between two electrodes. High-rate discharge is typically characterized by a low discharge penetration into the cathode and anode, meaning that only active material near the interfacial area of each electrode discharges before the electrochemical cell reaches its voltage cutoff (i.e., the active materials are not fully utilized). It is believed that high-rate discharge, and the resulting discharge of active material near the interfacial area of each electrode, creates an electrically impenetrable layer of discharge products near the surface of each electrode which prevents discharge of active material located deeper within each electrode. According to various embodiments, surface area may be defined as the entire outer surface area of an electrode (including surface area within the reservoirs described in this disclosure), whereas interfacial area may be defined as the portion of the overall surface area that consists of the interface between the anode and the cathode. Interfacial area must be covered by a separator, as will be described in greater detail later in the disclosure.

Batteries that discharge at a low rate are typically characterized by a more complete discharge penetration within each of the anode and cathode-such that a higher percentage of active material is discharged from each of the anode and cathode during low-rate discharge.

While increasing the interfacial area between the cathode and anode has been shown to provide improved discharge performance, increasing the interfacial area of a cell requires a corresponding increase in the amount of separator used within the cell to line the entire interfacial area between the cathode and anode. Due to the increased volume occupied by the separator within the cell, the volume of the cell occupied by active material must be decreased for a battery having a defined volume. Thus, increasing the interfacial area between the anode and cathode can improve the high-rate performance of the cell, but with a decrease in low-rate performance (due to the lower quantity of active material in each of the anode and cathode).

It is believed that high-rate performance of a cell can be improved by increasing the interfacial area of the cathode and/or the anode within a bobbin-type cell, while maintaining a circular cross-sectional shape of the interfacial area between the cathode and anode. Maintaining a circular cross-sectional shape between the cathode and anode minimizes the volume of separator material needed to completely line the interfacial area between the electrodes. In certain embodiments, increasing the interfacial area of a cathode/electrolyte or an anode/electrolyte is provided by defining one or more electrolyte reservoirs within the cathode or within the anode. It is believed that the increased electrode/electrolyte interfacial area surrounding each electrolyte reservoir will provide increased reaction sites for the electrode to discharge near its surface during high-rate discharge, recognizing that high-rate discharge is typically characterized by low discharge penetration within an electrode. Consequently, it is believed that providing a cell with electrolyte reservoirs defined within an electrode will increase the high-rate performance of the cell, with minimal decrease in low-rate discharge performance because a minimal amount of active material is removed from each electrode.

Each of these electrolyte reservoirs are defined as voids existing within an electrode that are filled with electrolyte (e.g., free electrolyte added after placement of the electrodes within the cell). Because these reservoirs are electrically neutral within an electrode (e.g., within the cathode or within the anode), the sidewalls of the reservoirs do not need to be lined with separator material, and therefore the sidewalls of the electrolyte voids are defined by exposed electrode material.

It will be understood that the concepts reflected in the embodiments shown and described in reference to FIGS. 2-11 may be integrated into an electrochemical cell having components as shown and described in at least FIG. 1. Components that are also present in FIG. 1 and described in related disclosure portions may have similar structure and function as in FIGS. 2-11. For example, when referring to various electrodes in the description for FIGS. 2-11, the description of contents of the first electrode 18 (e.g., an anode) and the second electrode 12 (e.g., a cathode) from the previous sections of this disclosure (including the component mixtures) may apply to the first and second electrodes shown and described for FIGS. 2-11. The locations and the volume attributable to the electrolyte reservoirs are optimized and depend upon overall cell designs.

Figure 2:
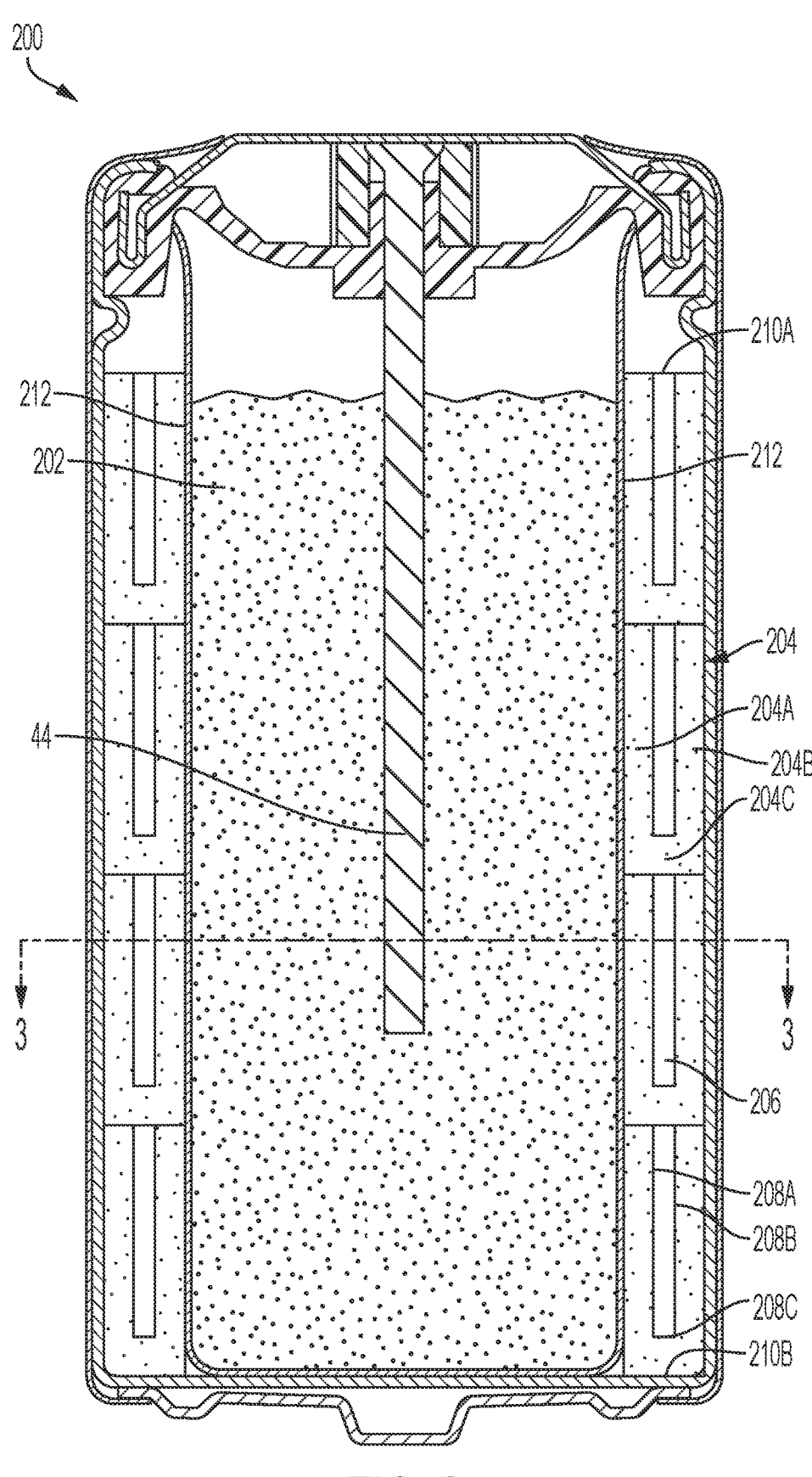
FIG. 2 is a side, cross-sectional, elevational view of components of an example electrochemical cell with slotted ring cathodes in accordance with some embodiments.
Figure 3:
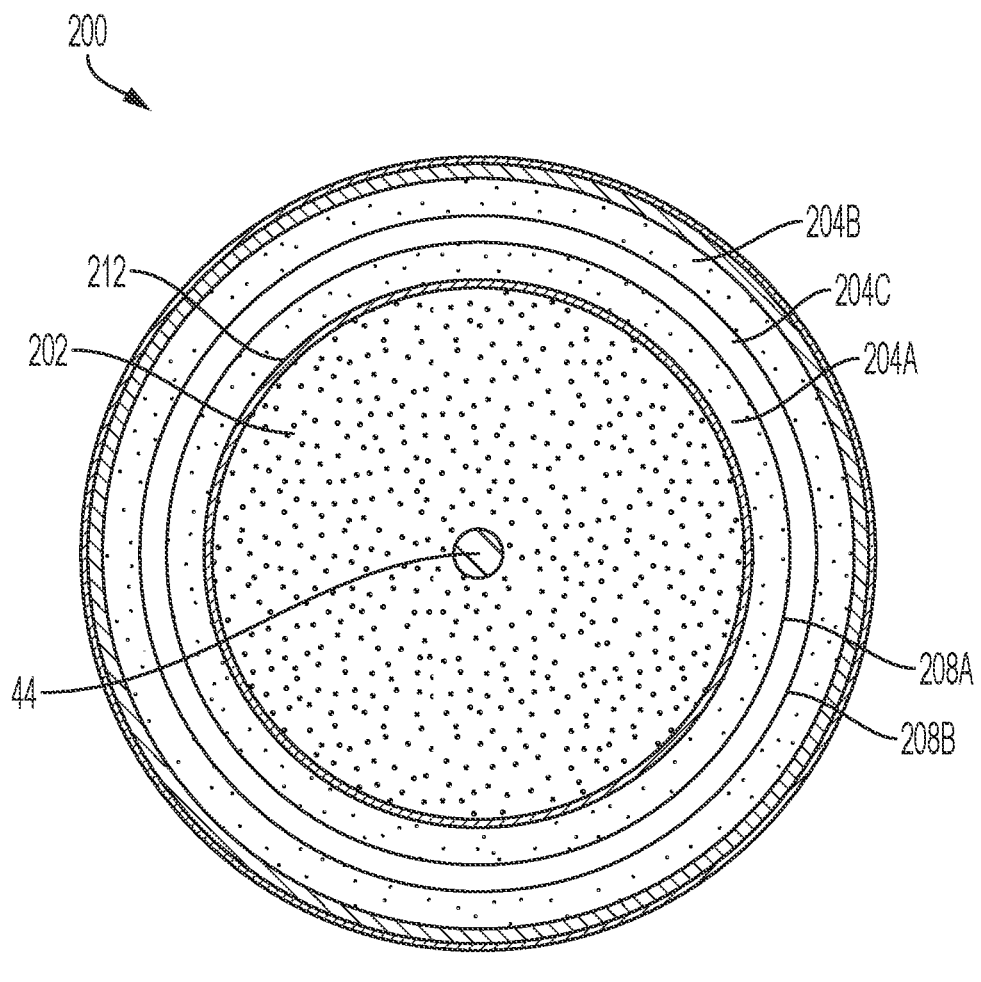
FIG. 3 is a top, cross-sectional view of the electrochemical cell of FIG. 2 along line 3-3 showing components of an example electrochemical cell in accordance with some embodiments.

Referring now to FIGS. 2-3, a first example of an electrochemical cell having at least one electrolyte reservoir defined within a cathode is shown. FIG. 2 illustrates a side, cross-sectional view of the electrochemical cell 200, and FIG. 3 shows a top, cross-sectional view of the electrochemical cell 200, taken along the cross-sectional 3-3 line in FIG. 2. In some embodiments, the cell 200 may include a first electrode 202 and a second electrode 204. In some embodiments, the first electrode 202 may be an anode having contents analogous to those described previously herein. The anode may be in electrical contact with a terminal of the electrochemical cell via a current collector. In some embodiments, the second electrode 204 may be a cathode having contents analogous to those described previously herein. The cathode may be in electrical contact with the interior surface of the battery can. In the illustrated embodiment, the cathode 204 comprises one or more slotted rings, with each slot defined within a respective ring defining an electrolyte reservoir. Similar to the embodiment discussed in reference to FIG. 1, the slotted rings are stacked within the electrochemical cell can, and define a hollow cylindrical interior having a circular cross-section. Collectively, the entire stack of slotted rings defines the cathode. In the embodiment shown, 4 slotted rings are stacked to form the cathode, however, other number of slotted rings may be provided in other embodiments. The height of each slotted ring may be adjusted depending on the number of slotted rings used, such that the overall height of the cathode (defined by the collective height of the slotted rings between a bottom edge of the cathode 210B and a top edge of the cathode 210A) fits within the electrochemical cell can for a defined electrochemical cell size.

The interior sidewall of the cathode is lined with a separator 212, and the interior of the cylindrical opening is filled with anode material such that the anode is insulated from the cathode by the separator.

As shown, the slots within each slotted ring define voids 206 within the slotted rings. As shown, a single slot may be defined within each slotted ring, although other embodiments may define a plurality of slots within each slotted ring. Where a plurality of slots are defined within each slotted ring, these slots may be at least substantially parallel, or the slots may be defined at different angles within each ring. Moreover, the slots may extend from the same end of the slotted ring (e.g., from the top end of each slotted ring, similar to that shown in FIG. 2). In other embodiments where a plurality of slots are defined within each slotted ring, the slots extend from opposite ends (e.g., from the top end and from the bottom end of each slotted ring).

With reference again to FIG. 2, the slots may be blind-such that the slots do not extend through the entire height of the slotted ring. Thus, each slotted ring may comprise a first portion 204A and a second portion 204B that is located across the void from the first portion 204A, and a third portion 204C that electrically connects the first portion and the second portion. Each of the first portion, the second portion, and the third portion may have identical contents. As just one example, this configuration may be formed directly with a special set of tools or by manufacturing a cathode ring, and subsequently cutting a blind slot into the top surface of the cathode ring. The depth and width of the blind slot may be optimized to balance the increased surface area of the cathode that is formed by cutting the slot with the decreased active material within the cathode that results from cutting the slot. With reference briefly to FIG. 3, the slots have a cross-sectional shape corresponding with the cross-sectional shape of the ring—such that a circular ring has a circular slot formed therein.

Referring again to FIG. 2, the void 206 is defined between a respective first wall 208A (on the first portion 204A), a second wall 208B (on second portion 204B), and a third wall 208C (on third portion 204C). It should be understood that FIG. 2 is not drawn to scale, and the third wall 208C may be substantially smaller than the first wall and second wall 208A, 208B. The resulting void 206 within a slot of a slotted ring 204A, B, C defines a reservoir that may be filled with electrolyte. As shown, the cathode of an electrochemical cell may define at least one reservoir, such as a plurality of reservoirs.

Figure 4:
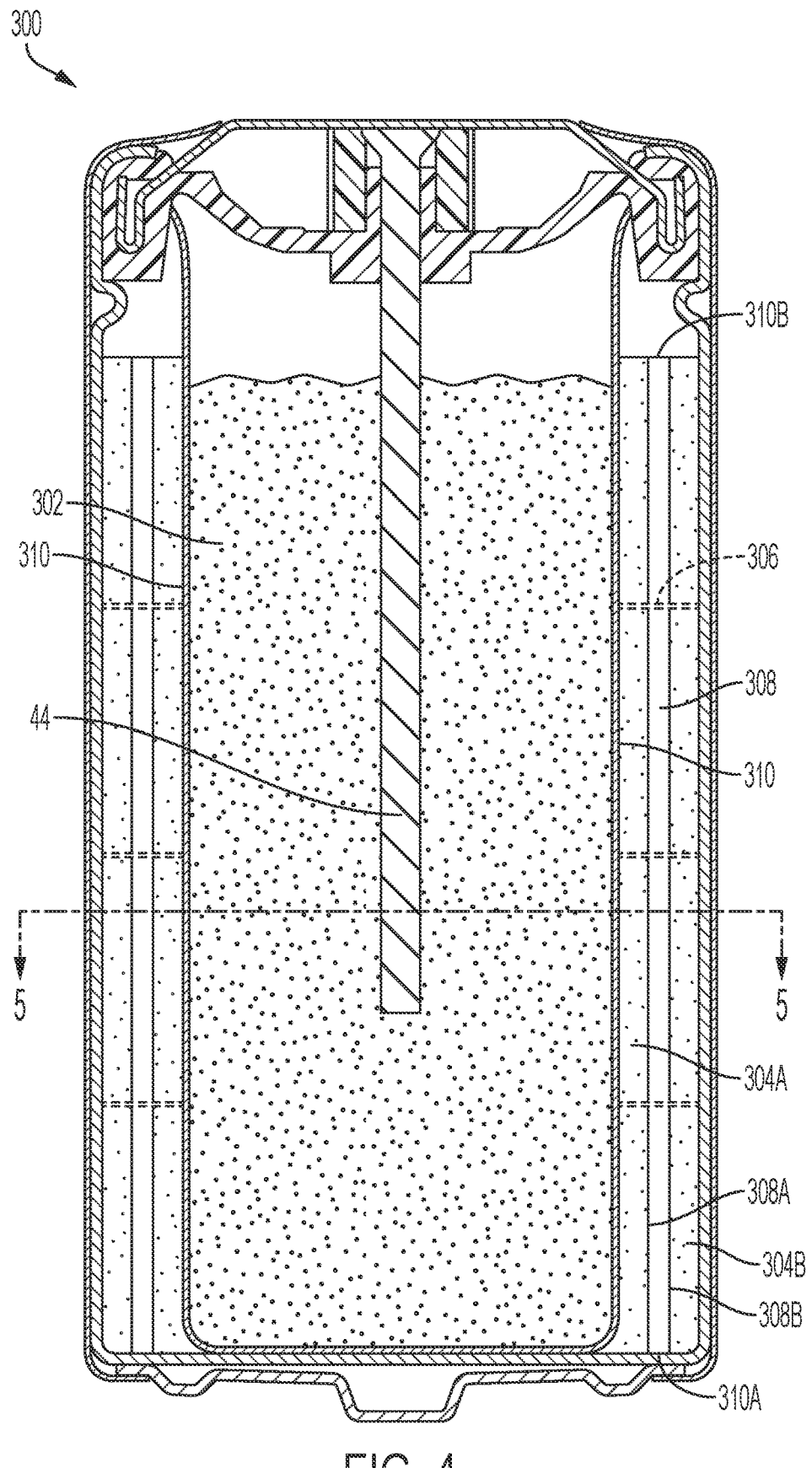
FIG. 4 is a side, cross-sectional, elevational view of an example electrochemical cell with mesh conductors in accordance with some embodiments.
Figure 5:
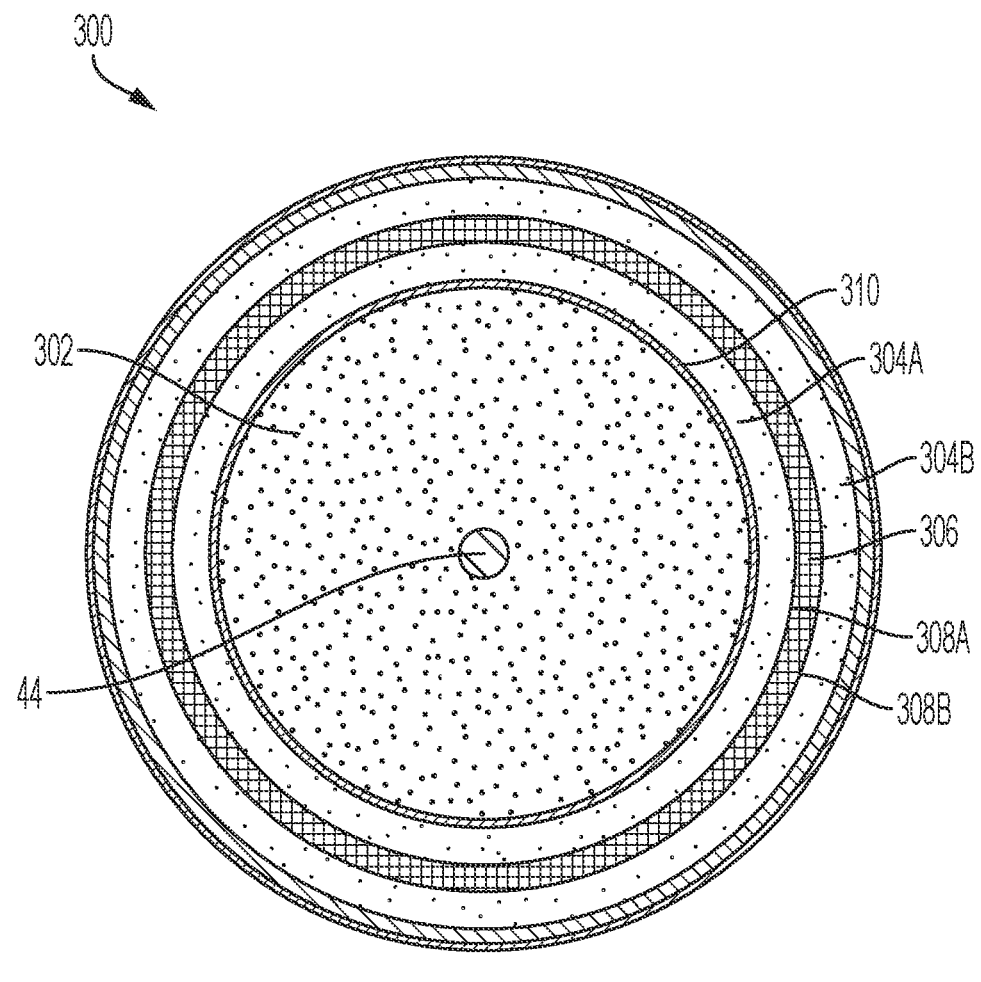
FIG. 5 is a top, cross-sectional view of the electrochemical cell of FIG. 4 along line 5-5 showing components of an example electrochemical cell with mesh conductors in accordance with some embodiments.

FIGS. 4-5 illustrate another example embodiment of an electrochemical cell having at least one electrolyte reservoir defined within the cathode. FIG. 5 is a top, cross-sectional view of FIG. 4, taken along the cross-sectional 5-5 line shown in FIG. 4. In some embodiments, the cell 300 may include a first electrode 302 and a second electrode having a first portion 304A and a second portion 304B. In some embodiments, the first electrode 302 may be an anode. In some embodiments, the second electrode may be a cathode having a first cathode portion 304A and a second cathode portion 304B. In some embodiments, the first and second cathode portions 304A, 304B may be concentric rings. In the illustrated embodiment of FIG. 4, the first cathode portion 304A may comprise a plurality of first cathode rings that are stacked to collectively form the first cathode portion 304A. The second cathode portion 304B may comprise a plurality of second cathode rings-located concentric with the first cathode portion 304A and spaced a distance from an interior surface of the first cathode portion 304A, such that a void is defined within an interior surface of the first cathode portion 304A and an exterior surface of the second cathode portion 304B. The void defines an electrolyte reservoir within the cathode 304. As shown, the interior surface of the second cathode portion 304A defines the interfacial area with the anode 302, and is therefore lined with the separator 310.

As shown in FIGS. 4-5, the first and second cathode portions 304A, 304B are electrically connected by one or more conductive disks 306 bridging the void between the first cathode portion 304A and the second cathode portion 304B. The conductive disks 306 are planar in the embodiment shown in FIGS. 4-5 and are positioned between stacked cathode rings. Thus, during assembly, a lower cathode ring (including a portion of the first cathode portion 304A and second cathode portion 304B) may be inserted into the electrochemical cell can, then a conductive disk 306 is placed on the exposed top surface of the lower cathode ring before an upper cathode ring is inserted into the cell can. This process may be repeated until all cathode rings are stacked within the cell can. As shown in FIG. 4, an electrochemical cell may comprise 4 stacked cathode rings, and 3 conductive disks. However, other portions of cathode rings and conductive disks may be used in alternative embodiments. As shown, the conductive disks 306 are generally ring shaped, and have an outer diameter that is larger than the diameter of the interior surface of the second cathode portion 304B, and an inner diameter that is smaller than the diameter of the outer surface of the second cathode portion 304A. Said differently, the conductive disks 306 are sized to bridge the void between the first cathode portion 304A and the second cathode portion 304B. Although the conductive disks are shown as continuous circles within the embodiment of FIGS. 4-5, it should be understood that the conductive disks may be discontinuous, and defining a conductive bridge between the first cathode portion 304A and the second cathode portion 304B at different locations around the perimeter of the cathode 304.

The one or more conductive disks 306 may comprise nickel or steel. In some embodiments, as shown in FIG. 5, the one or more conductive disks 306 may have a mesh structure (e.g., having at least 95% holes).

The resulting structure provides an electrolyte reservoir between an interior surface 308A of the first cathode portion 304A and an exterior surface 308B of the second cathode portion 304B. Electrolyte (e.g., added as free electrolyte) may flow freely within the electrolyte reservoir, through holes within the mesh of the conductive disks 306.

Figure 6:
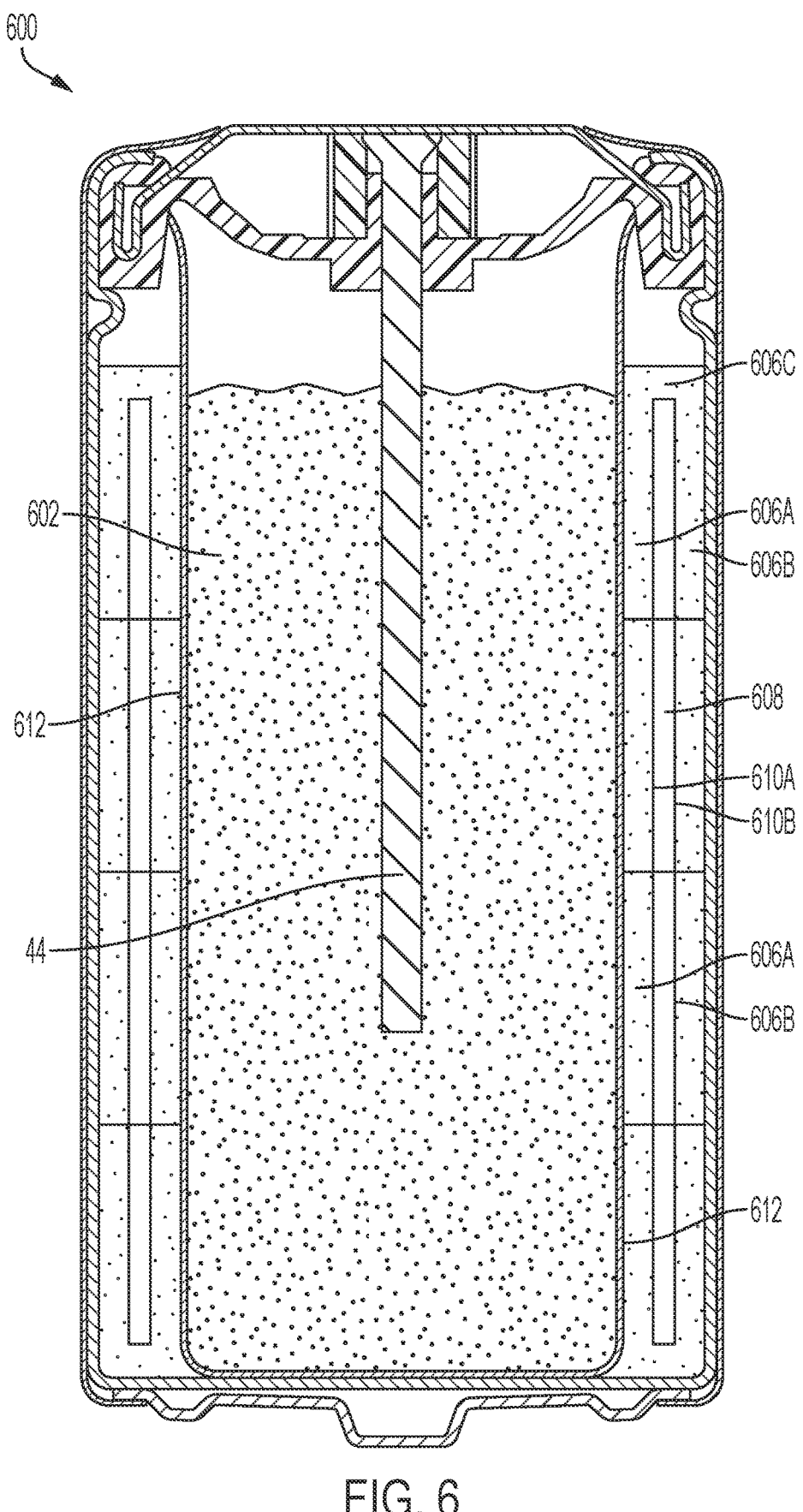
FIG. 6 is a side, cross-sectional, elevational view of an example electrochemical cell with slotted rings and concentric rings in accordance with some embodiments.

Referring now to FIG. 6, a side, cross-sectional view of the electrochemical cell 600 is shown. In some embodiments, the cell 600 may include a first electrode 602, a second electrode having a first electrode portion 606A and a second electrode portion 606B, and a third electrode 606C. In some embodiments, one or more voids 608 may also be disposed in the cell 600. In some embodiments, the first electrode 602 may be an anode. In some embodiments, the first and second electrode portions 606A, 606B may be a first and second cathode portions 606A, 606B, which, in some embodiments, may be one or more slotted rings, one or more concentric rings, or a combination of the two ring configurations. For example, as shown in FIG. 6, slotted rings are disposed on the top and bottom of the stack of rings and concentric rings are disposed between the slotted rings. In some embodiments, the configuration may be interchanged, with concentric rings on the top and bottom and slotted rings disposed between them. In some embodiments, and as previously described with respect to at least FIG. 2, a third electrode portion 606C may conductively connect the first and second electrode portions 606A, 606B for the slotted rings. In some embodiments, the concentric rings may be conductively connected by the slotted rings. In some embodiments, one or more voids 608 may be disposed between the slotted rings and/or the concentric rings. In some embodiments, the concentric conductive disks described in at least FIGS. 3, 4, and 5 may conductively connect the slotted rings and/or the concentric rings. In some embodiments, the first and second electrode portions 606A, 606B may define one or more reservoirs between themselves, and the first and second electrode portions 606A, B may be separated from the one or more reservoirs by a first and second separator wall 610A, 610B. In some embodiments, a separator 612 may separate the cathode 606A, 606B, 606C from the anode 602.

Figure 7:
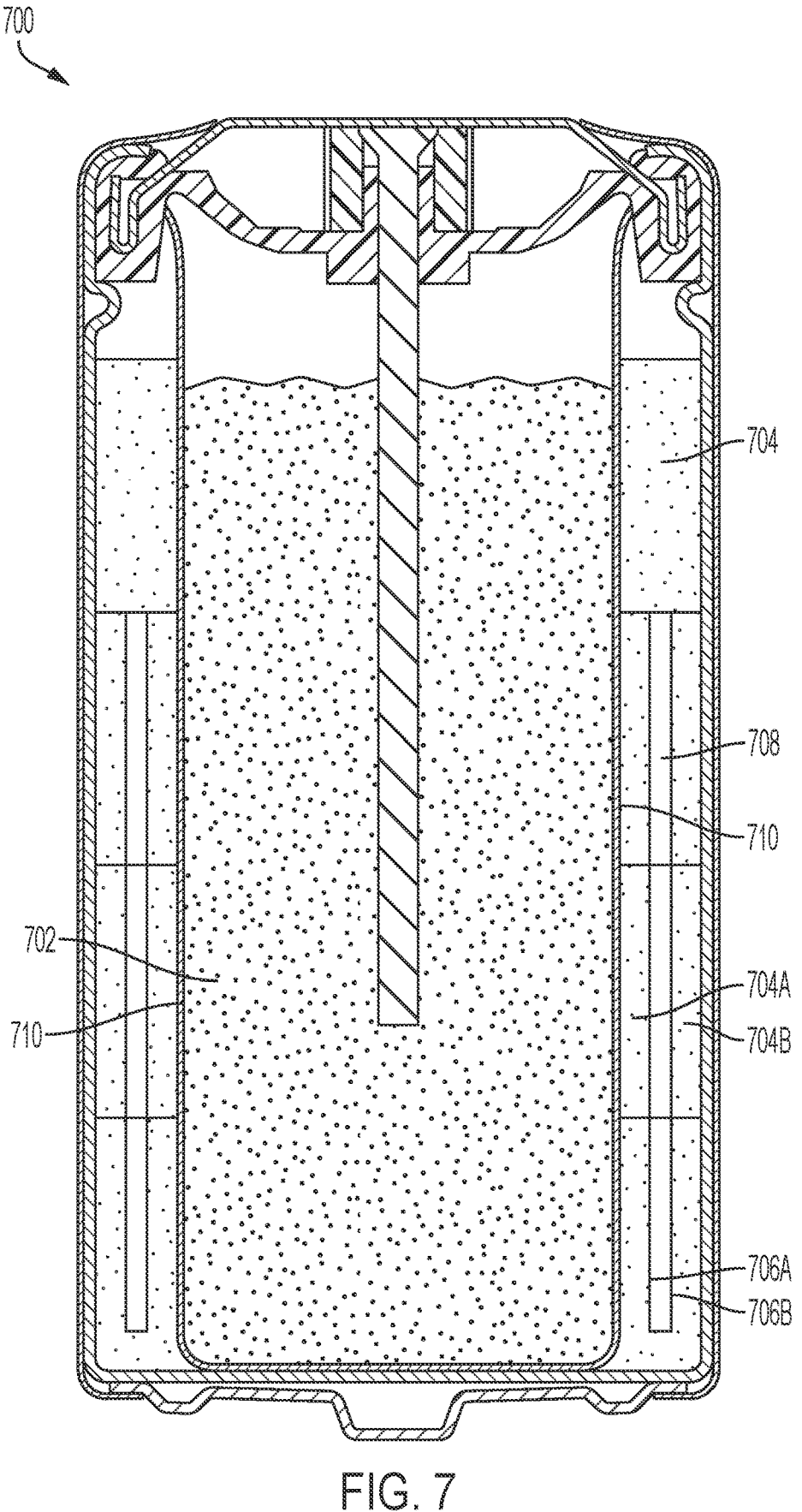
FIG. 7 is a side, cross-sectional, elevational view of an example electrochemical cell with a top disk and concentric rings in accordance with some embodiments.

Referring now to FIG. 7, a side, cross-sectional view of the electrochemical cell 700 is shown. In some embodiments, the cell 700 may include a first electrode 702, which may be an anode. In some embodiments, the cell 700 may also include a second electrode, which may include a first and second electrode portions 704A, 704B. In some embodiments, the second electrode may be a cathode, with a first cathode portion and a second cathode portion 704A, B. In some embodiments, the second electrode may comprise a set of concentric rings with first and second portions 704A, 704B and/or one or more contiguous disks 704, with a single portion only. In some embodiments, the concentric rings may be replaced with slotted rings, or slotted rings may be used in addition to the concentric rings. In some embodiments, the configuration shown and described with respect to FIG. 7 may have similar structure and function to the configuration shown and described with respect to FIG. 6, except FIG. 7 utilizes a contiguous disk in addition to the concentric rings, instead of one or more slotted rings in addition to the concentric rings. For example, one or more voids 708 may be disposed between the first and second portions 704A, 704B, which may define one or more reservoirs, and the first and second portions 704A, 704B may be separated from the reservoirs by respective separator walls 706A, 706B. In some embodiments, the placement of a contiguous disk on top of the one or more slotted rings or concentric rings may improve the ring strength of the one or more rings, as well as providing conductivity (or additional conductivity) between the one or more rings. In some embodiments, one or more contiguous disk may connect the concentric rings and/or the slotted rings on one side (i.e., the top or bottom the cell), while the other side is connected by the receptacle itself. In some embodiments, a separator 710 may separate the cathode 704A (or 704 in the case of the contiguous disk), 704B, from the anode 702.

Example Alkaline Electrodes with Anodes Containing Electrolyte Reservoirs

The various ring and disk combinations for the multiple portions of the second electrode as shown and described with respect to FIGS. 2-7 may be interchanged according to various product needs. An example electrochemical cell could utilize various combinations of one or more concentric rings, one or more slotted rings, and one or more solid rings.

With reference to FIGS. 8-11, electrolyte reservoirs may be defined within anodes of electrochemical cells. A single electrochemical cell may include one or more electrolyte reservoirs within the cathode and one or more electrolyte reservoirs within the anode, thereby increasing the surface area of each of the cathode and the anode without increasing the interfacial area lined with separator material between the cathode and the anode.

For those electrochemical cells having electrolyte reservoirs defined within the anode, a high percentage (e.g., more than 60%) of EMD within the cathode may be discharged with the water present in the cathode without any water transfer from anode. However, less than 10% zinc could be discharged with hydroxide ions (—OH) existing in the anode. Various examples of electrolyte reservoirs in the anode are shown and described below with respect to at least FIGS. 8-11.

Figure 8:
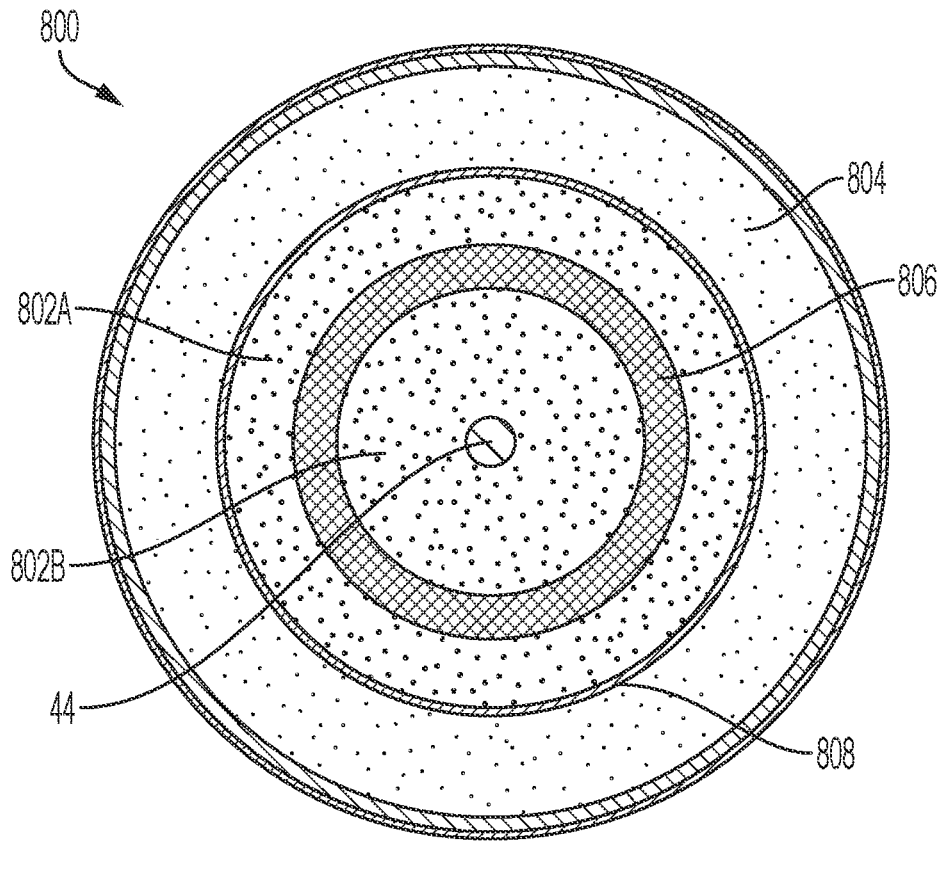
FIG. 8 is a top, cross-sectional view of an example electrochemical cell with a porous mesh in accordance with some embodiments.

FIG. 8 illustrates a top view of an electrochemical cell 800 having an electrolyte reservoir defined within the anode according to one embodiment. In some embodiments, the cell 800 comprises a first electrode having a first and second electrode portions 802A and 802B. In some embodiments, the first electrode may be an anode having a first anode portion 802A and 802B. In some embodiments, the cell 800 may include a second electrode 804 (e.g., a cathode). In the illustrated embodiment of FIG. 8, the first electrode portion 802A may be a ring-shaped electrode portion. The second electrode portion 802B may be a solid cylinder-shaped electrode portion. The outer surface of the first electrode portion 802A defines the interfacial surface with the cathode (and is lined by the separator 808).

Traditional zinc-based anode material used in alkaline electrochemical cells is a gel that is incapable of maintaining its own shape. Thus, one or more rigid components must be placed between the first and second anode portions 802A, 802B to maintain separation therebetween. In the illustrated embodiment of FIG. 8, an electrically conductive foam 806 may be disposed between the first and second anode portions 802A, 802B to maintain separation therebetween. The foam is a porous material defining voids within the one or more pores. The foam may be an open-cell foam (such that free electrolyte added to the cell can penetrate into the open cells of the foam). The plurality of open cells of the foam define individual voids that can fill with electrolyte to define electrolyte reservoirs. In some embodiments, the foam 806 may be a zinc foam that serves to electrically connect the first anode portion 802A and the second anode portion 802B, and the zinc may discharge at least partially during discharge of the battery (a greater percentage of the zinc of the zinc foam may discharge during low-rate discharge than during high-rate discharge). In some embodiments, the zinc foam 806 may be porous with 95% holes throughout. In some embodiments, the zinc foam 806 may comprise an inert material that does not discharge during discharge of the electrochemical cell. In such embodiments, one or more conductive materials may connect the first anode portion 802A and the second anode portion 802B. In some embodiments, the first and second anode portions 802A, 802B may each consist of substantially the same component mixture, whereas in other embodiments there may be variations between the compositions of the first and second anode portions.

Figure 9:
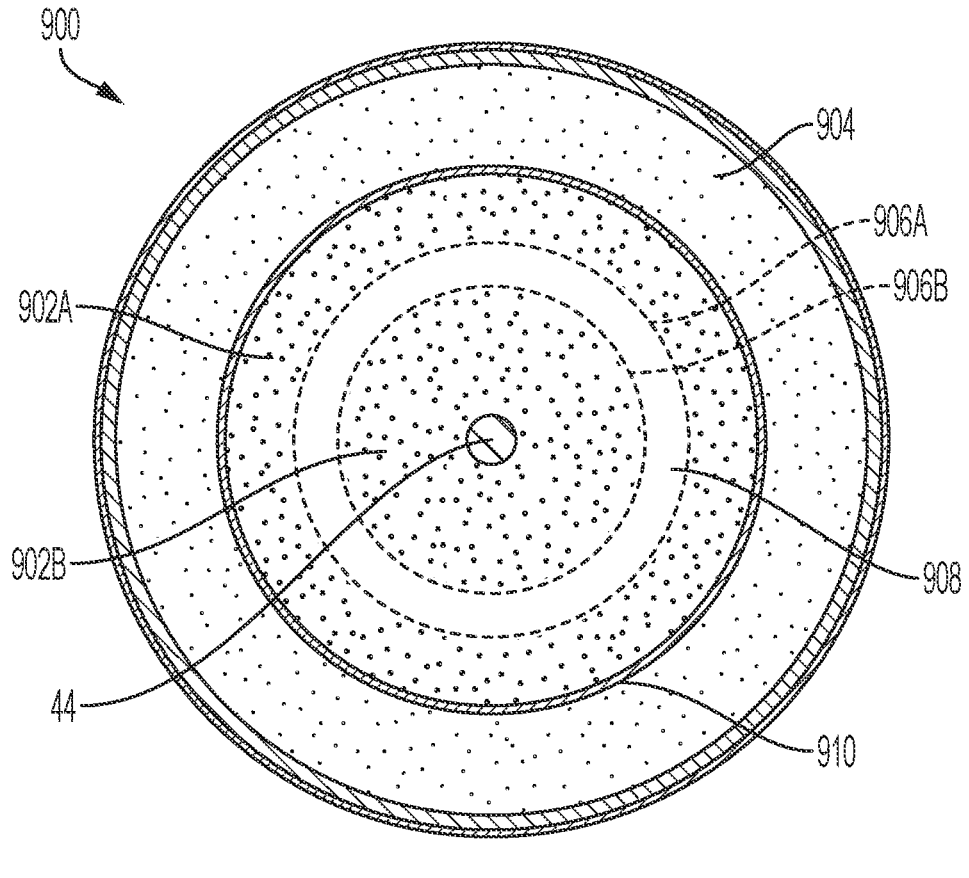
FIG. 9 is a top, cross-sectional view of an example electrochemical cell with a concentric mesh and a space defined within in accordance with some embodiments.

Referring now to FIG. 9, in some embodiments, a top view of an electrochemical cell 900 is shown. In some embodiments, the cell 900 may include a first electrode having a first electrode portion 902A and a second electrode portion 902B. In some embodiments, the first electrode may be an anode having a first anode portion 902A and a second anode portion 902B. In some embodiments, the cell 900 may include a second electrode 904, which may be a cathode 904. In the illustrated embodiment of FIG. 9, the first electrode portion 902A may be a ring-shaped electrode portion. The second electrode portion 902B may be a solid cylinder-shaped electrode portion. The outer surface of the first electrode portion 902A defines the interfacial surface with the cathode (and is lined by the separator 910).

As in FIG. 8, traditional zinc-based anode material used in alkaline electrochemical cells is a gel that is incapable of maintaining its own shape. Thus, one or more rigid components must be placed between the first and second anode portions 902A, 902B to maintain separation therebetween. In some embodiments, the first and second anode portions 902A, 902B may be separated by one or more porous sheets 906A, 906B to maintain shape. The porous sheets illustrated schematically in FIG. 9 are meshes 906A, 906B. In some embodiments, the one or more porous sheets may be embodied as zinc or copper to connect the two anodes. If two or more porous sheets are used, they need to be electrically connected.

Figure 10:
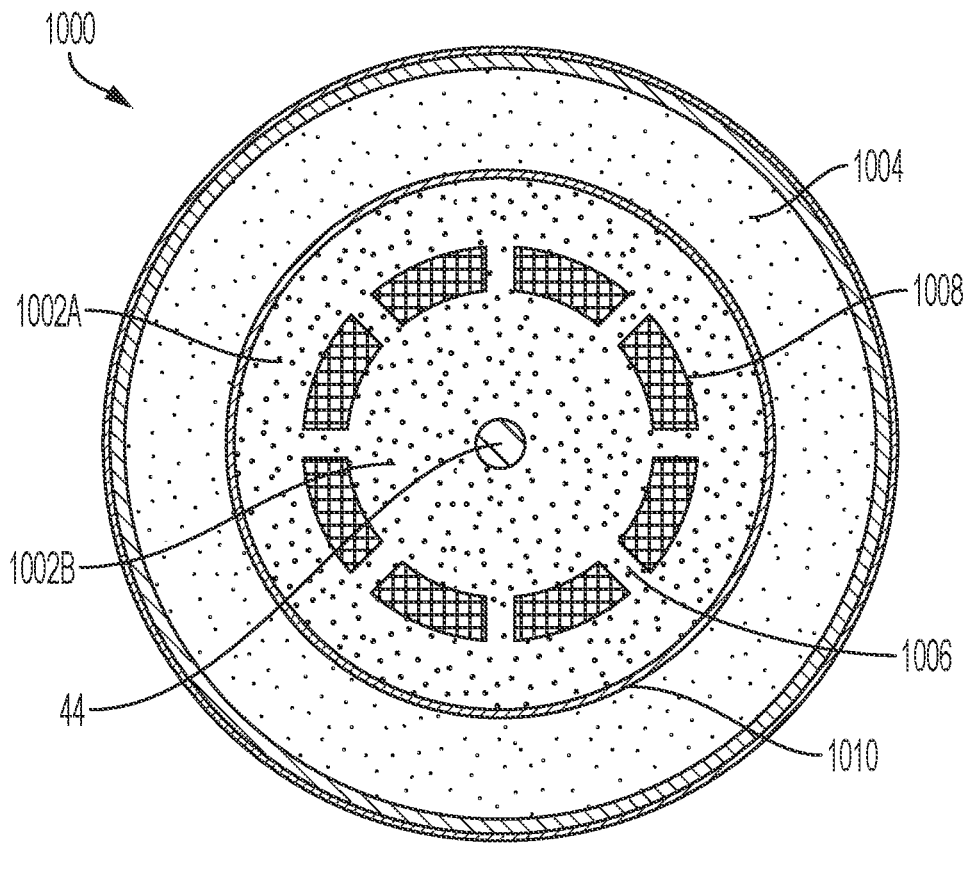
FIG. 10 is a top, cross-sectional view of an example electrochemical cell with a separator with holes disposed throughout in accordance with some embodiments.

Referring now to FIG. 10, in some embodiments, a top view of an electrochemical cell 1000 is shown. The electrochemical cell 1000 includes anode 1002 and cathode 1004 (separated from one another by separator 1010). In some embodiments, the cell 1000 includes two concentric anode portions 1002A, 1002B, which may be separated by a porous sheet 1008. In some embodiments, the porous sheet 1008 is a separator material having a plurality of holes punched therethrough so that the second electrode 1002B is electrically connected with the first electrode 1002A by zinc particles and no additional anode connector will be required. In some embodiments, the porous sheet 1008 may be a discontinuous ring. In the embodiment of FIG. 10, the porous sheet 1008, when saturated with electrolyte (e.g., free electrolyte added to the cell) operates as an electrolyte reservoir within the anode.

Figure 11:
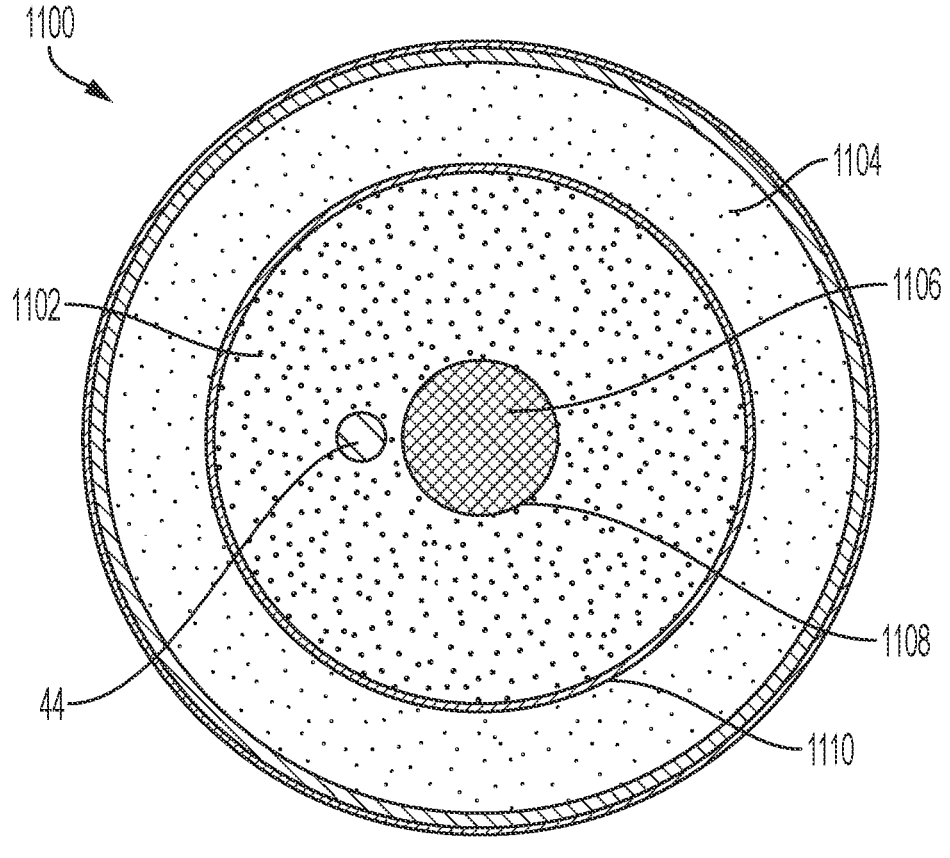
FIG. 11 is a top, cross-sectional view of an example electrochemical cell with an electrolyte reservoir disposed in the center of the anode in accordance with some embodiments.

Referring now to FIG. 11, in some embodiments, an electrochemical cell 1100 is shown, wherein the electrolyte reservoir is defined within the center of the first electrode 1102. In some embodiments, the first electrode 1102 may be an anode. In some embodiments, the cell 1100 may include a second electrode 1104, which may be a cathode. In some embodiments, the electrolyte reservoir is defined within an open interior (filled with electrolyte) of a mesh material 1106 that defines an interior surface of the first electrode 1102. In other embodiments, the open interior is defined by a foam (e.g., a zinc or copper foam) and open cells of the foam may be filled with electrolyte (e.g., free electrolyte) to define electrolyte reservoirs. In some embodiments, as shown in at least FIG. 11, for such electrolyte reservoirs, the current collector for the electrochemical cell 1100 (such as the current collector 44 defined previously in the specification) may need to be positioned off-center to accommodate the ring-shape of the anode. In some embodiments, the mesh 1106 may be separated from the first electrode 1102 by a porous sheet as discussed herein. In some embodiments, the mesh 1106 may be similar in structure to the mesh 806 shown and described with respect to FIG. 8, the meshes 906A, 906B as shown and described with respect to FIG. 9, and/or the separator 1008 as shown and described with respect to FIG. 10. In some embodiments, a separator 1110 may separate the cathode 1104 from the anode 1102.

The various configurations shown and described with respect to FIGS. 8-11 be selectively combined.

While embodiments have been illustrated and described in detail above, such illustration and description are to be considered illustrative or exemplary and not restrictive. It will be understood that changes and modifications may be made by those of ordinary skill within the scope and spirit of the following claims. Embodiments include any combination of features from different embodiments described above and below.

The embodiments are additionally described by way of the following illustrative non-limiting examples that provide a better understanding of the embodiments and of its many advantages. The following examples are included to demonstrate preferred embodiments. It should be appreciated by those of skill in the art that the techniques disclosed in the examples which follow represent techniques used in the embodiments to function well in the practice of the embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the embodiments.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

What is claimed is:

1. An electrochemical cell comprising:
a container;
a first electrode disposed within the container, wherein the first electrode comprises;
a first electrode portion defining a concentric inner surface of the first electrode; and
a second electrode portion defining a concentric outer surface of the first electrode, wherein the second electrode portion is conductively connected with the first electrode portion and spaced apart from the first electrode portion to define at least one reservoir surrounding the first electrode portion and located between the first electrode portion and the second electrode portion;
wherein the at least one reservoir is bounded at least in part by a first reservoir wall of the first electrode portion and a second reservoir wall of the second electrode portion;
a second electrode disposed within the container;
a separator disposed between the first electrode and the second electrode; and
an electrolyte solution permeating the first electrode and the second electrode and at least partially filling the at least one reservoir.

2. The electrochemical cell of claim 1, wherein the first electrode comprises a cathode and the second electrode comprises an anode, and wherein the first electrode portion comprises a first cathode portion, and the second electrode portion comprises a second cathode portion.

3. The electrochemical cell of claim 1, further comprising a conductor extending between the first electrode portion and the second electrode portion.

4. The electrochemical cell of claim 1, wherein the first electrode further comprises a third electrode portion that conductively connects the first electrode portion and the second electrode portion.

5. The electrochemical cell of claim 4, wherein the first electrode portion comprises a first set of one or more slotted rings and the second electrode portion comprises a second set of one or more slotted rings, and wherein each ring of the first set of one or more slotted rings is conductively connected to a corresponding ring of the second set of one or more slotted rings.

6. The electrochemical cell of claim 4, wherein the third electrode portion comprises one or more conductive disks.

7. The electrochemical cell of claim 4, wherein the third electrode portion comprises at least one electrically conductive mesh.

8. The electrochemical cell of claim 5, wherein the at least one reservoir is further defined by one or more voids disposed within the one or more slotted rings, respectively.

9. The electrochemical cell of claim 6, wherein the one or more conductive disks are selected from a group consisting of nickel and steel.

10. The electrochemical cell of claim 7, wherein the at least one electrically conductive mesh is selected from a group consisting of nickel and steel.

11. The electrochemical cell of claim 1, wherein the first electrode comprises an anode and the second electrode comprises a cathode, and wherein the first electrode portion comprises a first anode portion, and the second electrode portion comprises a second anode portion.

12. The electrochemical cell of claim 11, wherein the first reservoir wall and the second reservoir wall are covered by a separator material, wherein the separator material comprises one or more holes.

13. The electrochemical cell of claim 11, wherein the at least one reservoir comprises a conductive porous foam.

14. The electrochemical cell of claim 13, wherein the conductive porous foam is selected from a group consisting of copper and zinc.

15. An electrochemical cell comprising:
a container;
a first electrode disposed within the container, wherein the first electrode comprises;
a first electrode portion defining a concentric inner surface of the first electrode; and at least one open space defining at least one reservoir within the first electrode; and wherein the at least one reservoir is bounded at least in part by a first reservoir wall of the first electrode portion and a second reservoir wall of a second electrode portion defining a concentric outer surface of the first electrode portion, wherein the at least one reservoir is located between the first reservoir wall of the first electrode portion and the second reservoir wall of the second electrode portion;

a second electrode disposed within the container;

a separator disposed between the first electrode and the second electrode; and an electrolyte solution permeating the first electrode and the second electrode and at least partially filling the at least one reservoir.

16. The electrochemical cell of claim 15, further comprising a current collector, wherein the current collector is not aligned with a center of the electrochemical cell.

17. The electrochemical cell of claim 15, wherein the first electrode is an anode and the second electrode is a cathode.

18. The electrochemical cell of claim 15, wherein the at least one reservoir is selected from a group consisting of at least one foam and at least one mesh.

19. The electrochemical cell of claim 18, wherein the at least one mesh comprises zinc.

20. An electrochemical cell comprising:

a container;

a first electrode disposed within the container, wherein the first electrode comprises;

a first electrode portion; and a second electrode portion conductively connected with the first electrode portion and spaced apart from the first electrode portion to define at least one reservoir between the first electrode portion and the second electrode portion;

wherein the at least one reservoir is bounded at least in part by a first reservoir wall of the first electrode portion and a second reservoir wall of the second electrode portion; and a third electrode portion comprising one or more conductive disks that conductively connects the first electrode portion and the second electrode portion;

a second electrode disposed within the container;

a separator disposed between the first electrode and the second electrode; and an electrolyte solution permeating the first electrode and the second electrode and at least partially filling the at least one reservoir.

* * * * *